United States Patent

Yoshida et al.

[11] Patent Number: 5,879,260
[45] Date of Patent: Mar. 9, 1999

[54] TOROIDAL TYPE CONTINUOUSLY VARIABLE TRANSMISSION WITH BIASING CAM DIRECTLY CONNECTED TO A SUN GEAR

[75] Inventors: Takeo Yoshida, Shizuoka; Masaki Nakano, Yokohama, both of Japan

[73] Assignees: Nissan Motor Co., Ltd., Yokohama; JATCO Corporation, Fuji, both of Japan

[21] Appl. No.: 859,711

[22] Filed: May 21, 1997

[30] Foreign Application Priority Data

May 23, 1996 [JP] Japan .................................. 8-128249

[51] Int. Cl.[6] .................................................. F16H 15/50
[52] U.S. Cl. ............................ 475/214; 475/216; 475/269
[58] Field of Search ..................................... 475/214, 215, 475/216, 269, 323, 325, 331

[56] References Cited

U.S. PATENT DOCUMENTS 3,410,146  11/1968  Nordeen .............................. 475/214 X
5,478,290  12/1995  Buuck et al. ..................... 475/269 XQ

FOREIGN PATENT DOCUMENTS 0 389 790  10/1990  European Pat. Off. .
  389790   10/1990  European Pat. Off. ............... 475/216
 5-39834    2/1993  Japan .
1199145    7/1970  United Kingdom .

Primary Examiner—Khoi Q. Ta
Attorney, Agent, or Firm—Foley & Lardner

[57] ABSTRACT

In a toroidal type continuously variable transmission including a forward/backward switching device with a planetary gear unit, a loading cam device coaxially arranged behind the switching device to receiving a torque from the planetary gear unit, a speed change unit coaxially arranged behind the loading cam device to receive a torque from the loading cam device, and a fixed wall member arranged between the switching device and the loading cam device to rotatably support the planetary gear unit, there is provided a connecting device which directly connect a sun gear of the planetary gear unit with an input part of the loading cam device to achieve a united rotation therebetween.

12 Claims, 3 Drawing Sheets

TOROIDAL TYPE CONTINUOUSLY VARIABLE TRANSMISSION WITH BIASING CAM DIRECTLY CONNECTED TO A SUN GEAR

BACKGROUND OF THE INVENTION

1. Field of the Invention

The present invention relates in general to an automotive transmission, and more particularly to a toroidal type continuously variable transmission which generally comprises a forward/backward switching device with a planetary gear unit, a loading cam device and a toroidal type speed change unit which are coaxially arranged.

2. Description of the Prior Art

One of continuously variable transmissions of the toroidal type is shown in Laid-open Japanese Patent Application 5-039834. In the transmission, a torque from the forward/backward switching device is transmitted to the toroidal type speed change unit through the loading cam device. The planetary gear unit of the switching device is rotatably supported by a fixed annular wall member through a bearing. In order to suppress excessive rotation speed of the bearing at the time when the planetary gear unit rotates relative to the wall member, the bearing is positioned near a rotation center of the planetary gear unit where the bearing exhibits a smaller peripheral speed. For achieving this positioning, the fixed annular wall member extends radially inward to such a position as to face a pinion carrier of the planetary gear unit.

The toroidal type speed change unit comprises input and output cone discs and power (or friction) rollers each being put between the input and output discs to establish a frictional engagement therewith. By continuously changing the inclination angle of the power rollers relative to the input and output discs, speed change is continuously carried out during power transmission from the input disc to the output disc. To effectively make the power transmission from the input disc to the output disc, it is necessary to provide a condition wherein the power rollers are biased against the input and output discs in accordance with a transmitted torque. For this purpose, the loading cam device is employed.

The loading cam device comprises a cam disc which is arranged coaxial with the input disc and, cam rollers which are rotatably disposed between respective inclined cam surfaces of the cam disc and the input disc. The cam rollers are held by a holder in a manner to be regulated in relative positioning. The torque applied to the cam disc is transmitted to the cam rollers and then to the input disc. During this, the cam rollers are forced to roll on the respective inclined cam surfaces of the cam disc and the input disc to produce between the cam disc and the input disc a certain thrust in accordance with the transmitted torque. With the thrust thus produced, the power rollers are compressed between the input and output discs.

In the transmission of the publication, the forward/backward switching device is connected to the loading cam device using the pinion carrier as an output means for the cam disc of the loading cam device. Thus, for rotatably supporting the planetary gear unit, the connection between the pinion carrier and the cam disc has to be made by a separate member which straddles the annular wall member. Thus, in this transmission, the number of parts used is increased, which causes difficulty of assembly and increase of cost.

SUMMARY OF THE INVENTION

It is therefore an object of the present invention to provide a toroidal type continuously variable transmission which is free of the above-mentioned drawbacks.

According to the present invention, there is provided a toroidal type continuously variable transmission in which, for eliminating the above-mentioned drawbacks, the sun gear of a planetary gear unit of a forward/backward switching device is directly engaged with an input part of a loading cam device.

According to the present invention, there is provided a toroidal type continuously variable transmission which comprises a forward/backward switching device including a planetary gear unit; a loading cam device coaxially arranged behind the switching device to receiving a torque from the planetary gear unit; a speed change unit coaxially arranged behind the loading cam device to receive a torque from the loading cam device; a fixed wall member arranged between the switching device and the loading cam device, the wall member extending to the position of a pinion carrier of the planetary gear unit to rotatably support the planetary gear unit; and a connecting device for directly connecting a sun gear of the planetary gear unit with an input part of said loading cam device to achieve a united rotation therebetween.

DETAILED DESCRIPTION OF THE EMBODIMENTS

Figure 1:
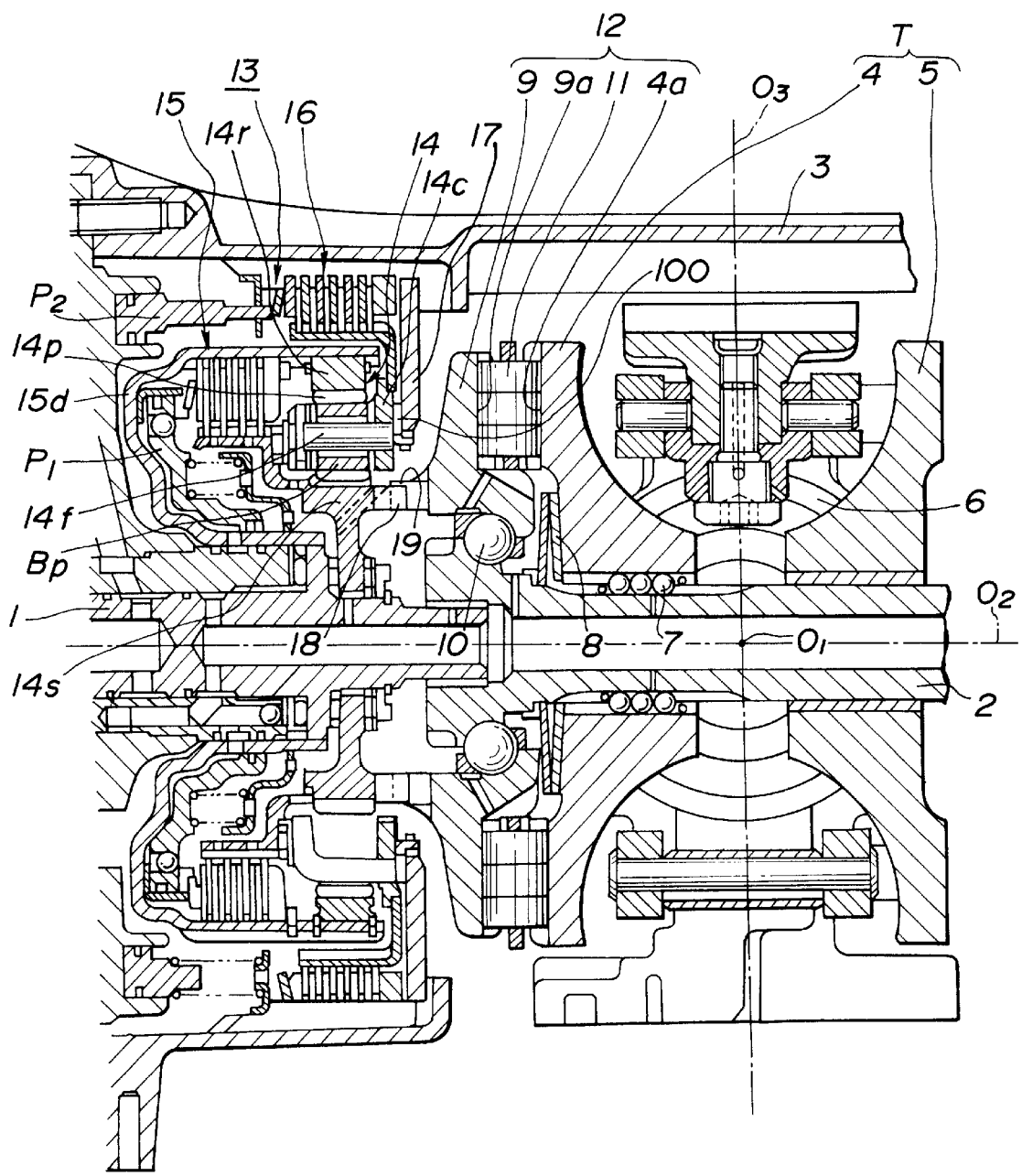
FIG. 1 is a sectional view of an essential portion of a toroidal type continuously variable transmission which is a first embodiment of the present invention.
Figure 2:
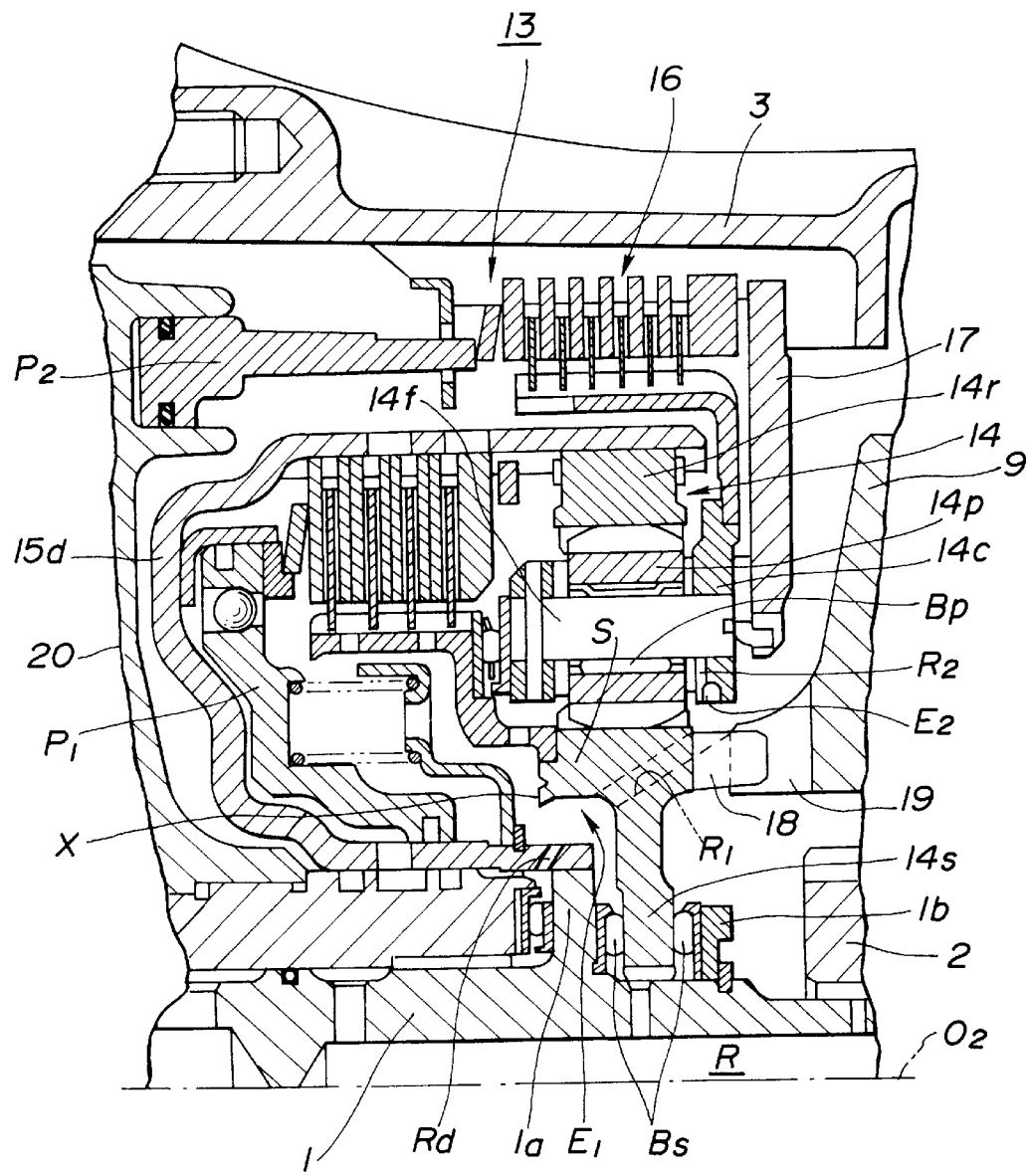
FIG. 2 is an enlarged sectional view of a portion of the transmission of the first embodiment, where a forward/backward switching device and associated parts thereof are arranged.

Referring to FIGS. 1 and 2, there is shown a toroidal type continuously variable transmission which is a first embodiment of the present invention.

In FIG. 1, denoted by numeral 1 is an input shaft and 2 is an output shaft which are aligned in a transmission case 3. As shown, a rear end of the input shaft 1 is received in a bore formed in a front end of the output shaft 2 to effect a relative rotation therebetween.

Around the output shaft 2, there are disposed input and output cone discs 4 and 5. Between the input and output discs 4 and 5, there are disposed power rollers 6, which thus constitute a toroidal type speed change unit "T". A so-called ball-spline structure 7 is arranged between the input disc 4 and the output shaft 2 to permit an axial movement of the input disc 4 relative to the output shaft 2. The output disc 5 is rotatable relative to the output shaft 2. Although not shown in the drawing, the torque of the output disc 5 is transmitted to drive wheels through a known mechanism. A disc spring 8 is compressed between the input disc 4 and a stepped front portion of the output shaft 2 to bias the input disc 4 toward the output disc 5. With this, each power roller 6 is compressed between the input and output discs 4 and 5 with a certain biasing force.

A cam disc 9 is coaxially arranged in front of the input disc 4, which is mounted on a diametrically enlarged front portion of the output shaft 2 through a ball-thrust bearing 10. The input disc 4 and the cam disc 9 are formed at their mutually facing sides with respective cam surfaces 4a and 9a each being inclined in a radial direction. Cam rollers 11 are rotatably disposed between the cam surfaces 4a and 9a to constitute a loading cam device 12. The cam disc 9 serves as a rotatable input means of the loading cam device 12.

Around the input shaft 1, there is arranged a forward/backward switching device 13 which can change the direction of rotation before transmitting the rotation of the input shaft 1 to the cam disc 9 of the loading cam device 12. The forward/backward switching device 13 generally comprises a planetary gear unit 14, a forward clutch 15, a piston member P2 for the forward clutch 15, a backward brake 16 and a piston member P1 for the backward brake 16. The piston member P2 or P1 selectively establishes engagement and disengagement of the forward clutch 15 or the backward brake 16. As shown, these piston members P2 and P1 are arranged at front portions of the backward brake 16 and the forward clutch 15, that is, at a remote position from the loading cam device 12 with respect to the planetary gear unit 14.

The planetary gear unit 14 is of a single pinion type, which comprises a sun gear 14s. The sun gear 14s is coaxially and rotatably disposed about the input shaft 1 and unitable to the input shaft 1 through the forward clutch 15. A ring gear 14r is connected to the input shaft 1 through a clutch drum 15d of the forward clutch 15. A pinion carrier 14c is connectable to the transmission case 3 through the backward brake 16. A pinion 14p is rotatably supported by a pinion shaft 14f through a pinion is bearing Bp.

The planetary gear unit 14 is rotatably supported, through a bearing 100, by an annular wall member 17 which extends radially inward from the transmission casing 3. As shown, the annular wall member 17 is arranged between the forward/backward switching device 13 and the loading cam device 12 and extends to a position to face the pinion carrier 14c. The bearing 100 is positioned at a leading end of the annular wall member 17 where the bearing 100 exhibits a smaller peripheral speed. With this positioning, excessive rotation speed of the bearing 100 can be suppressed.

As shown, in the present invention, the sun gear 14s is directly engaged or connected with the cam disc 9 of the loading cam device 12. With this, the sun gear 14s serves as a drive means for the loading cam device 12.

That is, in the first embodiment shown in FIG. 1, for the direct engagement, the sun gear 14s and the cam disc 9 are integrally formed with mutually engaged gears 18 and 19. The gear 18 of the sun gear 14s comprises circularly arranged teeth which are projected toward the cam disc 9, and the gear 19 of the cam disc 9 comprises circularly arranged teeth which are projected toward the sun gear 14s and operatively engaged with the teeth of the gear 18.

In the following, operation of the transmission of the first embodiment will be described with reference to FIG. 1.

Rotation of the input shaft 1 is transmitted to the clutch drum 15d and to the ring gear 14r through the clutch drum 15d.

When, under this condition, the forward clutch 15 becomes engaged by the piston member PI, the rotation of the clutch drum 15d is transmitted to the sun gear 14s through the forward clutch 15 and thus to the cam disc 9 through the gears 18 and 19. The rotation of the cam disc 9 is transmitted to the input disc 4 through the cam rollers 11, and the rotation of the input disc 4 is transmitted to the output disc 5 through the power rollers 6. During this rotation transmission, the cam rollers 11 are forced to roll on the cam surfaces 4a and 9a to push the input disc 4 toward the output disc 5 thereby to compress the power rollers 6 between the input and output discs 4 and 5.

While, when the backward brake 16 becomes engaged by the piston member P2, the pinion carrier 14c becomes fixed. With this, the rotation of the ring gear 14r transmitted thereto from the input shaft 1 through the clutch drum 15d rotates the sun gear 14s in a reversed direction. The reversed rotation of the sun gear 14s is transmitted to the cam disc 9 through the gears 18 and 19, and to the output disc 5 in substantially the same manner as has been described hereinabove.

The manner for obtaining a continuous speed change of the transmission will be described in the following.

In the drawing, references "O1" and "O2" denote rotation axes of the power rollers 6 and the input and output discs 4 and 5, respectively. It is to be noted that the axis "O1", extends perpendicular to the surface of FIG. 1. Reference "O3" is a pivot axis about which each power roller 6 pivots.

As is shown in FIG. 1, while the power rollers 6 keep such a position that the rotation axis "O1" thereof is on the same level as the rotation axis "O2" of the input and output discs 4 and 5, the inclination angle of each power roller 6 about the pivot axis "O3" is kept unchanged, and thus, corresponding speed change ratio is kept.

When the power rollers 6 are shifted in such a manner that the rotation axis "O1" thereof is offset from the rotation axis "O2" of the input and output discs 4 and 5, each power roller 6 is automatically pivoted about the pivot axis "O3" in a direction corresponding to the offset. With this, the positions where each power roller 6 contacts the input and output discs 4 and 5 are changed thereby continuously varying the speed change ratio, that is, the speed ratio between the input and output discs 4 and 5.

When, after obtaining a given value of the speed change ratio, the power rollers 6 are shifted back to the original position where the rotation axis "O1" thereof is on the same level as the rotation axis "O2" of the input and output discs 4 and 5, the pivoting movement of each power roller 6 about the axis "O3" stops.

In the following, advantageous features possessed by the above-mentioned transmission of the first embodiment will be described.

First, engagement or connection between the sun gear 14s and the cam disc 9 is directly made by the gears 18 and 19 integrally formed thereon. Thus, reduction in the number of parts, simplification of assembly and reduction of cost are all achieved. In fact, there is no need of employing a separate member which corresponds to the separate member employed in the above-mentioned conventional transmission.

Second, the gear 18 to which a marked load is applied during direct torque transmission from the sun gear 14s to the loading cam device 12 is integral with the sun gear 14. This means that hardening processing for the gear 14 and the sun gear 14s can be achieved at the same time.

Third, the piston members P1 and P2 are arranged at remote positions from the loading cam device 12 with respect to the planetary gear unit 14. Thus, operative engagement of the gears 18 and 19 is easily carried out without being obstructed by such piston members P1 and P2. That is, the axial length between the two gears 18 and 19 can be reduced, which brings about a vibration-free torque transmission from the sun gear 14s to the cam disc 9.

FIG. 2 is an enlarged sectional view showing an upper half of the forward/backward switching device 13 shown in FIG. 1. This drawing is provided for explaining a unique lubrication oil flowing structure defined in the device 13. In general, the pinion carrier 14c, the pinion 14p, the pinion bearing "Bp" and the pinion shaft 14f are those whose lubrication is not easy. Particularly, in a reverse mode of the transmission wherein the backward brake 16 is engaged and thus the pinion carrier 14c is fixed, feeding of lubrication oil to the pinion bearing Bp is difficult.

The unique oil flowing structure is constructed to effectively lubricate such parts of the planetary gear unit 14.

The oil flowing structure comprises a cylindrical portion "S" integrally formed on a front (or left) portion of the sun gear 14s. Within the cylindrical portion "S", there is defined an annular bore "E1" which serves as an oil reservoir. The annular bore "E1" has a diametrically reduced front end which is defined by an annular ridge "X" projected radially inward from the cylindrical "S" of the sun gear 14s. The annular ridge "X" may be provided by caulking the left end of the cylindrical portion "S". An oil passage "R1" is formed in the sun gear 14s, which extends radially obliquely outward from the annular bore "E1" to a portion exposed to the gear 18.

Accordingly, under rotation of the sun gear 14s, lubrication oil collected in the annular bore "E1" is forced to flow in the oil passage "R1" toward the pinion carrier 14c due to a centrifugal force thus produced. Provision of the oil passage "R1" in the sun gear 14s brings about reduction in weight of the sun gear 14s.

The oil flowing structure further comprises an oil passage "R2" formed in the pinion carrier 14c. As shown, the oil passage "R2" has an enlarged inlet part "E2" which faces to an outlet opening of the oil passage "R1" of the sun gear 14s. With provision of the oil passage "R2", the lubrication oil discharged from the oil passage "R1" is effectively applied to the pinion 14p, the pinion shaft 14f and the pinion bearing "Bp". Accordingly, even in a reverse mode wherein the pinion carrier 14c is fixed, the pinion bearing "Bp" can be effectively lubricated. Provision of the oil passage "R2" in the pinion carrier 14c brings about reduction in weight of the pinion carrier 14c.

In addition to the above, a unique supporting structure is employed for resisting a considerable thrust inevitably produced in the forward/backward switching device 13 under operation of the transmission.

That is, as is shown in FIG. 2, on the input shaft 1, there are provided first and second annular supporting portions 1a and 1b, which are axially spaced. The first supporting portion 1a is integral with the input shaft 1, while the second supporting portion 1b is detachably connected to the input shaft 1 through a stop ring. An inner disc part of the sun gear 14s is slidably put between the first and second supporting portions 1a and 1b through thrust bearings "Bs". That is, axial displacement of the sun gear 14s relative to the input shaft 1 is suppressed or at least minimized. Thus, any thrust inevitably produced in the forward/backward switching device 13 is effectively absorbed by the input shaft 1 through the sun gear 14s, so that an oil pump housing 20, the loading cam device 12 (see FIG. 1) and the speed change unit "T" are protected from a certain stress caused by such thrust. This brings about a compact and light-weight construction of the transmission.

Figure 3:
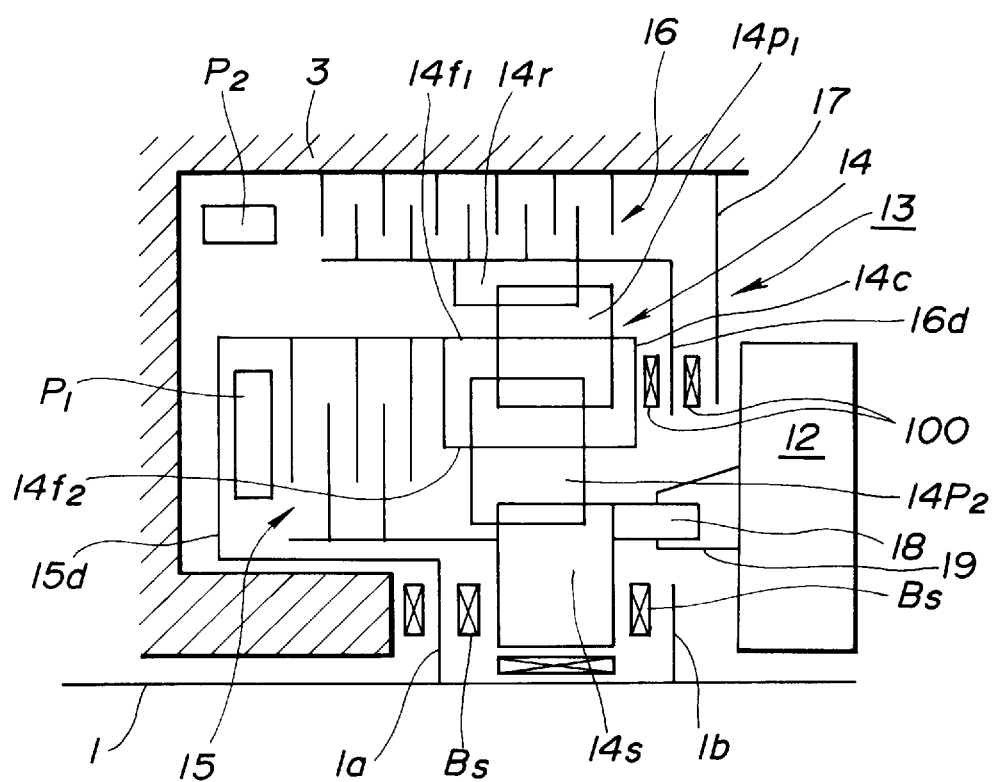
FIG. 3 is a schematic illustration of a forward/backward switching device employed in a second embodiment of the present invention.

Referring to FIG. 3, there is schematically shown a forward/backward switching device employed in a second embodiment of the present invention.

The transmission of this second embodiment is substantially the same as that of the above-mentioned first embodiment except the type of the planetary gear unit 14 in the forward/backward switching device. That is, in this second embodiment, the unit 14 is of a double pinion type.

In the forward/backward switching device 13 of this second embodiment, the sun gear 14s is rotatably disposed on the input shaft 1 but connectable to the input shaft 1 through the clutch drum 15d upon operation of the forward clutch 15. Two pinions 14p1 and 14p2 are rotatably held by respective pinion shafts 14f1 and 14f2 of a pinion carrier 14c. The pinion carrier 14c is connected to the input shaft 1 through the clutch drum 15d of the forward clutch 15. The support plate 17 rotatably supports both the pinion carrier 14c and the clutch drum 16d. The ring gear 14r secured to an inner wall of the clutch drum 16d is connectable to the transmission case 3 together with the clutch drum 16d upon engagement of the backward brake 16.

In the following, operation of the transmission of the second embodiment will be described with reference to FIGS. 3 and 1.

Rotation of the input shaft 1 is transmitted to the clutch drum 15d and through the same to the pinion carrier 14c which has the two pinions 14p1 and 14p2 rotatably connected thereto.

When, under this condition, the forward clutch 15 becomes engaged by the piston member P1, the rotation of the clutch drum 15d is transmitted to the sun gear 14s through the forward clutch. The rotation of the sun gear 14s is transmitted finally to the output disc 5 (see FIG. 1) in the same manner as in the case of the above-mentioned first embodiment.

While, when the backward brake 16 becomes engaged by the piston member P2, the ring gear 14r becomes fixed to the transmission casing 3. Under this condition, the rotation of the pinion carrier 14c transmitted thereto from the input shaft 1 through the clutch drum 15d rotates the sun gear 14s in a reversed direction due to provision of the two pinions 14p1 and 14p2. The reversed rotation of the sun gear 14s is transmitted finally to the output disc 5 (see FIG. 1) in the same manner as in the case of the first embodiment.

Due to usage of the double pinion type planetary gear unit 14, speed reduction rate given to the sun gear 14s is great and thus greater torque is obtained in the second embodiment.

What is claimed is:

1. A toroidal type continuously variable transmission comprising:

a forward/backward switching device including a planetary gear unit;

a loading cam device coaxially arranged behind said switching device to receive a torque from said planetary gear unit;

a speed change unit coaxially arranged behind said loading cam device to receive a torque from said loading cam device;

a fixed wall member arranged between said switching device and said loading cam device, said wall member extending to the position of a pinion carrier of said planetary gear unit to rotatably support said planetary gear unit; and a connecting device for directly connecting a sun gear of said planetary gear unit with an input part of said loading cam device to achieve a united rotation therebetween.

2. A toroidal type continuously variable transmission as claimed in claim 1, in which said connecting device comprises:

a first gear comprising said sun gear; and a second gear comprising said input part of said loading cam device and operatively engaged with said first gear.

3. A toroidal type continuously variable transmission as claimed in claim 2, in which each of said first and second gears has a plurality of teeth which are circularly arranged around a rotation axis of said sun gear.

4. A toroidal type continuously variable transmission as claimed in claim 1, in which said forward/backward switching device has piston members positioned at a remote position from said loading cam device with respect to said planetary gear unit.

5. A toroidal type continuously variable transmission as claimed in claim 4, in which said planetary gear unit is one of a single pinion type and a double pinion type.

6. A toroidal type continuously variable transmission as claimed in claim 2, in which said sun gear is integrally formed with a cylindrical portion which has an annular interior defined therein, and in which said sun gear is formed with an oil passage which extends from said annular interior to a position exposed to said first gear.

7. A toroidal type continuously variable transmission as claimed in claim 6, in which said oil passage extends radially obliquely outward with respect to a rotation axis of said sun gear.

8. A toroidal type continuously variable transmission as claimed in claim 7, in which said annular interior has a diametrically reduced front end which is defined by an annular ridge projected radially inward from said cylindrical portion of the sun gear.

9. A toroidal type continuously variable transmission as claimed in claim 6, in which said pinion carrier is formed with an oil passage which has an enlarged inlet part facing an outlet opening of the oil passage of said sun gear.

10. A toroidal type continuously variable transmission as claimed in claim 1, in which an inner disc part of said sun gear is slidably put between first and second supporting portions provided on an input shaft which passes through said forward/backward switching device.

11. A toroidal type continuously variable transmission as claimed in claim 10, in which a thrust bearing is operatively disposed between said annular disc part of said sun gear and each of said first and second supporting portions.

12. A toroidal type continuously variable transmission as claimed in claim 1, in which said input part is a cam disc of said loading cam device.

* * * * *